(12) United States Patent
Ji et al.

(10) Patent No.: US 7,826,910 B2
(45) Date of Patent: Nov. 2, 2010

(54) SYSTEMS AND METHODS FOR CONTROL OVER UNRELIABLE NETWORKS

(75) Inventors: Kun Ji, Berkeley, CA (US); Ayman Fawaz, Berkeley, CA (US)

(73) Assignee: Siemens Aktiengesellschaft, München ( * ) Notice: Subject to any disclaimer, the term of this patent is extended or adjusted under 35 U.S.C. 154(b) by 473 days.

(21) Appl. No.: 12/032,897

(22) Filed: Feb. 18, 2008

(65) Prior Publication Data
US 2009/0024231 A1  Jan. 22, 2009

Related U.S. Application Data

(60) Provisional application No. 61/000,510, filed on Oct. 25, 2007, provisional application No. 60/961,446, filed on Jul. 20, 2007.

(51) Int. Cl.
*G05B 21/02* (2006.01)
*G05B 15/02* (2006.01)
*G05B 11/01* (2006.01)
*H04H 20/71* (2008.01)
*G04F 1/00* (2006.01)

(52) U.S. Cl. .............. 700/73; 700/9; 700/14; 700/20; 700/55; 455/3.01; 702/177; 702/178; 702/188

(58) Field of Classification Search ............ 700/3, 700/9, 10, 14, 19, 20, 21, 28, 51, 55, 73–74, 700/79, 96, 108–110, 121, 125, 150, 169, 700/173–175, 204, 275–278, 282–284, 292–294; 702/79, 83, 125, 177–181, 183, 188, 190, 702/193, 199; 455/3.01
See application file for complete search history.

(56) References Cited

U.S. PATENT DOCUMENTS

| 6,886,472 | B2 * | 5/2005 | Jammu et al. ............. 105/26.05 |
| 7,302,362 | B2 * | 11/2007 | Misra et al. .................. 702/182 |
| 7,437,596 | B2 * | 10/2008 | McFarland ..................... 714/4 |
| 2005/0288904 | A1 * | 12/2005 | Warrior et al. .............. 702/188 |

OTHER PUBLICATIONS

Bordons, Carlos, et al.; "A Generalized Predictive Controller for a Wide Class of Industrial Processes", IEEE Transactions on Control Systems Technology, vol. 6, No. 3, May 1998, pp. 372-387.
Ji, Kun, et al.; "Real-Time Control of Networked Control Systems via Ethernet", International Journal of Control, Automation, and Systems, vol. 3, No. 4, Dec. 2005, pp. 591-600.

* cited by examiner

*Primary Examiner*—Sean P Schechtman
(74) *Attorney, Agent, or Firm*—Donald B. Paschburg (57) ABSTRACT

A method and system may operate to receive a first data from a sensor of a controlled device via a wireless network at a first time, transmit the first data to a controller system, receive a second data from the sensor of the controlled device via the wireless network at a second time, transmit the second data to the controller system, determine that a third data has not been received prior to a predetermined time period, or that the third data has been received prior to the predetermined time period and the third data is outside of a determined range of values, calculate a fourth data based on the first data and the second data, and transmit the fourth data to the controller system at a third time.

14 Claims, 9 Drawing Sheets

LMN: Manipulated variable (analog actuating signal to be output)
PV: Process variable (measured value)

|     | Gain            | TI  | TD    |
|-----|-----------------|-----|-------|
| P   | Tg/(K*Ta)       | -   | -     |
| PI  | 0.9*Tg/(K*Ta)   | 3Ta | -     |
| PID | 1.2*Tg/(K*Ta)   | 2Ta | 0.5Ta |

SYSTEMS AND METHODS FOR CONTROL OVER UNRELIABLE NETWORKS

CLAIM OF PRIORITY

This application is based on, and hereby claims benefit of and priority to, U.S. Provisional Patent Application Ser. No. 61/000,510, filed on Oct. 25, 2007, and U.S. Provisional Patent Application Ser. No. 60/961,446, filed on Jul. 20, 2007, the contents of which are incorporated herein in their entirety for all purposes.

BACKGROUND OF THE INVENTION

1. Field of the Invention

The present invention relates generally to unreliable computer networks and more particularly, to transmitted data that is lost, delayed or out of range.

2. Description of the Related Art

Wireless sensors are often deployed in refineries and other manufacturing environments for monitoring applications. These industries may employ data from such wireless sensors and closed-loop process control to maximize performance of reactors, valves and heaters. Industrial process control applications may also benefit from using wireless sensors in this manner. However, closing the control loop over wireless networks is difficult because closed-loop control requires a continuous flow of feedback data from the wireless sensors to a controller. Since wireless networks are frequently subject to interference (i.e., cannot guarantee a timely flow of data), disruption of feedback data may affect a process control application's behavior and performance.

Figure 1:
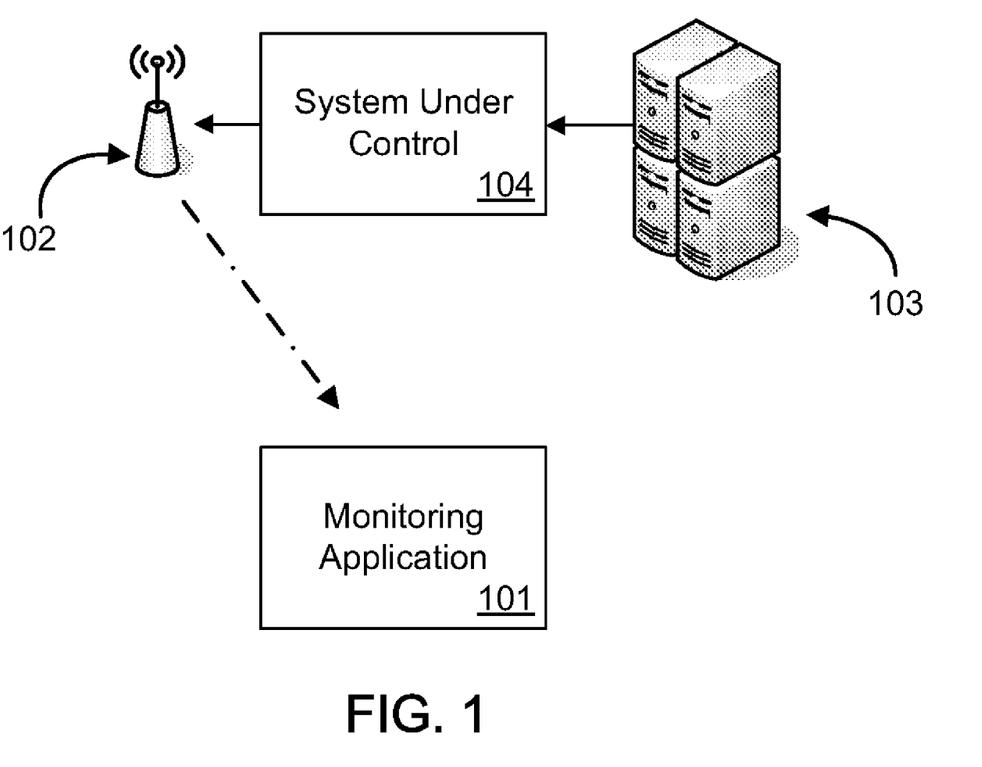
FIG. 1 illustrates a conventional open-loop system.

For example, FIG. 1 shows an exemplary environment using wireless sensors associated with a monitoring application where there is a need for closed-loop process control. As illustrated, a monitoring application 101 may receive data via a wireless sensor 102 where the data is associated with a system under control 104. The system under control 104 may be controlled by a controller device 103 but lacks a closed loop to send data from the monitoring application 101 to the controller 103.

Figure 2A:
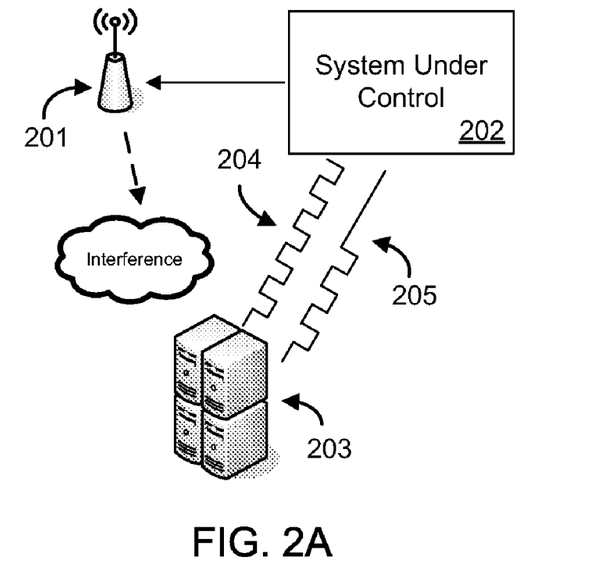
FIG. 2A illustrates a system experiencing signal interference.
Figure 2B:
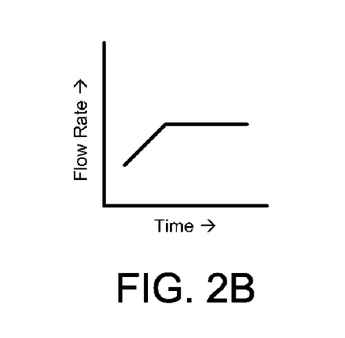
FIG. 2B is a flow rate versus time graph.
Figure 2C:
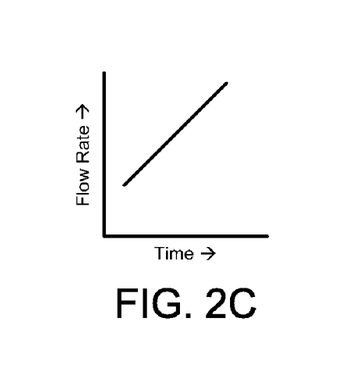
FIG. 2C is a flow rate versus time graph.

FIGS. 2A, 2B, and 2C illustrate another conventional problem by way of an example. In the example, a change in a liquid flow rate through a process heater (e.g., a heater in a refinery) may affect a liquid's temperature and therefore may affect a process' yield. FIG. 2A illustrates a system including such a heater and comprising a closed control loop. As illustrated, a wireless sensor 102 may transmit data comprising a flow rate or other characteristic of a system under control 104 (e.g., a process heater). According to desired operation, the data reaches a controller 203, and the controller 203 responds to the incoming data by sending a control signal 204 to the system under control 202. However, in some scenarios, the data from the sensor 201 may fail to reach the controller 203 or be otherwise corrupted due to wireless interference. In this instance, the controller 203 may send an incorrect control signal 205 to the system under control 202. For example, if the data transmitted by the sensor 201 indicated that a valve of the system under control 202 should be closed, the controller 203 may believe, due to a lack of received data, that the valve should remain open.

In another example, a desired control signal from the controller 203 would cause a flow rate to increase to a steady state level (as illustrated in FIG. 2B). However, interference between the wireless sensor 201 and the controller 203, as illustrated in FIG. 2A, may lead to corrupted sensor data. The corrupted sensor data may provide incorrect feedback to the controller 203, which results in a control signal from the controller 203 that causes the flow rate to continually increase (as shown in FIG. 2C). If the flow rate of the system under control 202 were to continually increase, problems may occur in the resulting process that may adversely affect the control performance and process behavior, and, in some instances, may create undesirable or harmful catastrophes in an industrial environment.

As discussed above, closed-loop process control over wireless networks in industrial environments is limited by the difficulty in obtaining a continuous flow of reliable sensor data from a wireless sensor to a controller. Currently, wireless sensor products have no intelligence, and focus solely on secure connectivity and reporting functions (e.g., alerting and asset tracking). Existing wireless sensor data aggregation products (e.g., wireless gateways and wireless managers) also exhibit no intelligence and typically only relay data they receive from wireless sensors. These products therefore cannot guarantee a continuous flow of wireless sensor data if network interference should occur. Therefore, it appears that no practical systems or methods exist for dealing with data transmission errors that may hinder closed-loop control over unreliable networks such as wireless networks.

SUMMARY

Generally, a method and system operate to receive a first data from a sensor of a controlled device via a wireless network at a first time, transmit the first data to a controller system, receive a second data from the sensor of the controlled device via the wireless network at a second time, transmit the second data to the controller system, determine that a third data has not been received prior to a predetermined time period or that the third data has been received prior to the predetermined time period, and the third data is outside of a determined range of values, calculate a fourth data based on the first data and the second data, and transmit the fourth data to the controller system at a third time.

With these and other advantages and features that will become hereafter apparent, a more complete understanding of the embodiments herein can be obtained by referring to the following detailed description and to the drawings appended hereto.

DETAILED DESCRIPTION

Figure 3:
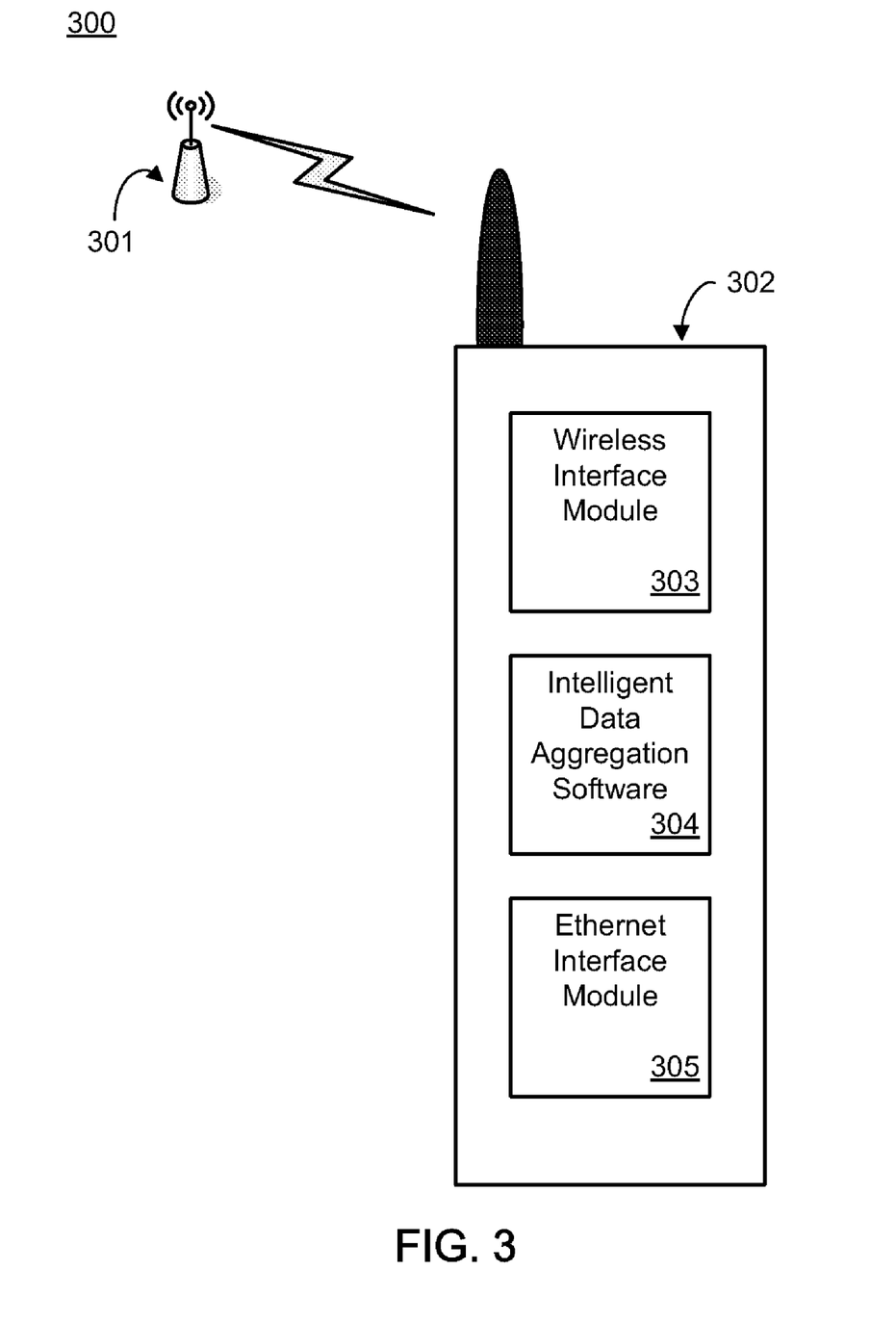
FIG. 3 illustrates a method according to some embodiments.

Now referring to FIG. 3, an embodiment of a system 300 is illustrated. The system 300 may comprise one or more wireless sensors 301 and a sensor gateway 302. The one or more wireless sensors 301 may monitor a controlled device. In some embodiments, the one or more wireless sensors 301 may be associated with an application that monitors the controlled device. Each wireless sensor 301 may monitor a single controlled device or in some embodiments, multiple wireless sensors 301 may be used to monitor a single controlled device.

In some embodiments, the sensor gateway 302 may be a controller, or an adjunct server that functions as a middle link between the sensor 301 and a controller (not shown). The sensor gateway 302 may comprise a wireless interface module 303, an Intelligent Data Aggregation ("IDA") software module 304, and an Ethernet interface module 305. The controller may be, but is not limited to, a proportional-integral-derivative ("PID") controller or advanced process control ("APC") controller.

The Ethernet interface module 305 may comprise any module to facilitate a network connection that is, or becomes, known. For example, the Ethernet interface module 305 may comprise a second wireless interface module, a coaxial connector, an RJ 45 connector, or an optical connector.

The wireless interface module 303 may comprise any wireless network transmitter/receiver that is or becomes known. For example, the wireless interface module 303 may be based on any variant of the IEEE 802.11 wireless protocol.

The IDA software module 304 may comprise an intelligent sensor data aggregator ("ISDA") that communicates with a wireless sensor network that includes one or more wireless sensors 301. An ISDA may provide continuous sensor data flow from one or more sensors to one or more controllers in a distributed control system. The ISD software module 304, according to some embodiments, may provide real-time control over an unreliable network such as a wireless network by increasing the control system's tolerance to data-packet loss and delay, which thereby enables intelligent sensor data aggregation to be implemented for industrial process controls over wireless networks. According to some embodiments, the ISD software module 304 may automatically generate a model-based sensor prediction function ("SPF") and a time-out scheme to deal with unreliable data transmission caused by network induced delay and data-packet loss. The SPF and time-out scheme ensure synchronous delivery of sensor data based on a control system's sampling rate. The ISDA may also provide continuous data flow between the one or more sensors 301 and one or more controllers, which may increase a system's tolerance to network-induced delay and packet loss in order to meet the requirements of implementing closed loop control.

In some embodiments, the IDA software module 304 may provide functions such as, but not limited to, wireless security, compensation for sensor value duplication in a case of redundant sensors, compensation for faulty sensor detection, compensation for delayed or lost data, and compensation for poor timing synchronization between the one or more sensors 301 and the sensor gateway 302. The IDA software module 304 may further comprise a processor (not shown) and a computer-readable medium to store instructions that when executed by the processor may perform a method. The method may be, but is not limited to, method 400 as described with respect to FIG. 4. In some embodiments, the computer-readable medium may be, but is not limited to, a hard drive, an optical drive, a flash drive, or a form of read only memory.

Figure 4:
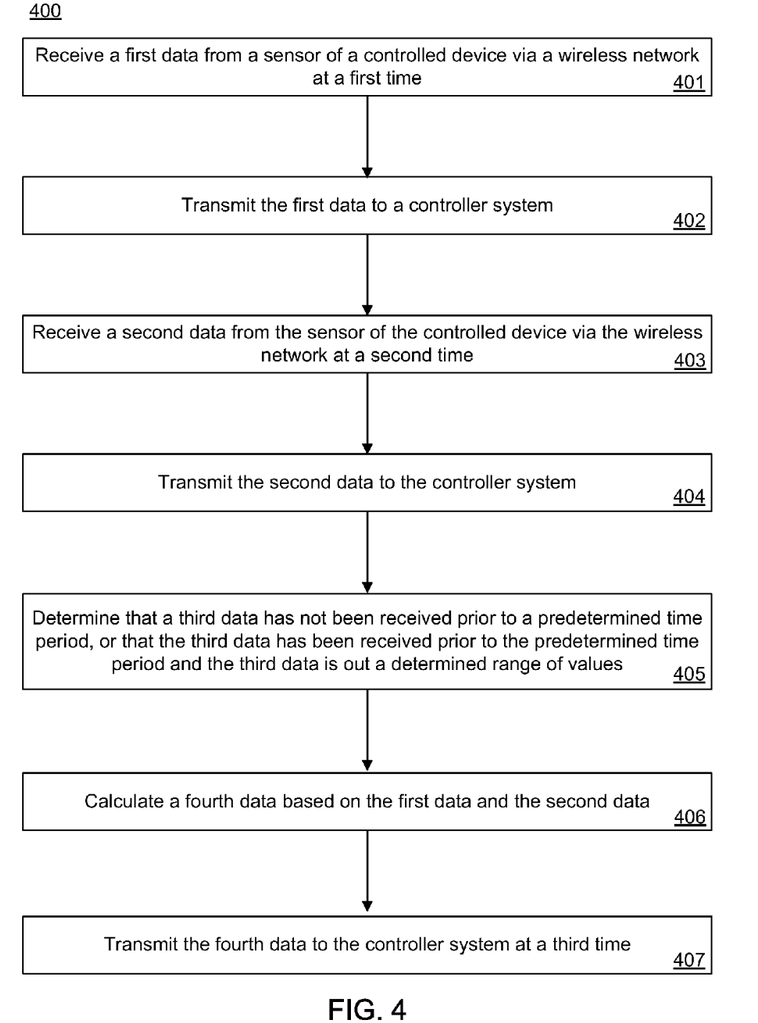
FIG. 4 illustrates a system according to some embodiments.

Now referring to FIG. 4, an embodiment of a method 400 is illustrated. Method 400 may be performed by any system such as, but not limited to, the system of FIG. 3. At 401, a first data from a sensor of a controlled device is received via a wireless network at a first time. The first data may comprise a value determined by the one or more sensors 301 and the first time may be based on a time interval (e.g., determined by a sampling rate). For example, the one or more sensors 301 may determine a value at every X milliseconds, where X is an integer such as 10, 100, 200, or the like. Therefore, in some embodiments, the first time may be the value of X. In some embodiments, the first data may be received at a sensor gateway such as sensor gateway 302.

For illustrative purposes, and to aid in understanding specific features, an example will now be introduced. This example will be carried through the detailed description and this example is not intended to limit the scope of the appended claims. According to the example, the one or more sensors 301 may determine or report a level of water in a tank where the level of water is controlled by a series of valves. The valves, in turn, are controlled by a controller system. In some embodiments, the level of the water tank is to remain constant and the controller system is to determine when the series of valves should be opened or closed to maintain a constant level of water.

Next, at 402, the first data is transmitted to a controller system. Continuing with the above example, the one or more sensors 301 may send data indicating the water level to the controller system via a sensor gateway 302. After the first data is received, the sensor gateway 302 may transmit the received data to the controller system to indicate a current level of the water in the tank to the controller system.

At 403, a second data from the sensor of the controlled device is received via the wireless network at a second time, and the second data is transmitted to the controller system at 404. In the above-mentioned example, data indicating a second water level may be sent to the controller system via the sensor gateway 302 at the second time. The second time may be based on the same time interval upon which the first time (e.g., X milliseconds where X is an integer) is based.

Next, at 405, it is determined that a third data has not been received prior to a predetermined time period, or that the third data has been received prior to the predetermined time period and the third data is out of a determined range of values. In this regard, the sensor gateway 302 may expect to receive data indicating a third determination of the water level before a predetermined time. After the predetermined time has expired, a determination is made at 405 that the data will not arrive in time to send an indication of the third water level to the controller system.

In some embodiments of 405, the third data may be interrupted, may be delayed in reaching the sensor gateway 302, or may be lost and may never reach the sensor gateway 302 due to interference. The interference may also corrupt the transmitted data causing the transmitted data to indicate false values. For example, noise associated with the interference may cause a transmitted value of 1 to be received as a value of 100. Therefore, the IDA software module 304 may store expected values and compare any values received at 405 with the stored expected values. In some embodiments, the predetermined time period may be less than the time interval of the first time and the second time. For example, the first time may be X milliseconds, the second time may be 2X milliseconds, and the predetermined time period may be 3X-Y milliseconds where Y is a value less than X.

A fourth data may be calculated based on the first data and the second data at 406. The fourth data may be based at least on a predicted sensor value that may be derived by an SPF. The SPF may be expressed as a formula and, in some embodiments, the formula may comprise:

$$\hat{y}(k+1)=(1+a)y(k)-ay(k-1)+bu(k-d)-bu(k-d-1)$$

The fourth data, $\hat{y}(k+1)$, may comprise a sum of a first expression (.e.g. $(1+a)y(k)-ay(k-1)$) and a second expression (e.g. $bu(k-d)-bu(k-d-1)$), where the first expression comprises a product (e.g. $ay(k-1)$) of the first data, $y(k-1)$, and a first coefficient a subtracted from a product (e.g. $(1+a)y(k)$) of the second data, $y(k)$, and a second coefficient $(1+a)$, and where the second expression comprises a product (e.g. $bu(k-d-1)$) of a first controller output, $u(K-d-1)$, and a third coefficient b subtracted from a product (e.g. $bu(k-d)$) of a second controller output, $u(K-d)$, and the third coefficient. The first coefficient may comprise a value of a base of the natural logarithm raised to a power of a product of negative 1 and a sampling time divided by a settling time (e.g. $a=e^{-(T/T_g)}$).

Figure 5:
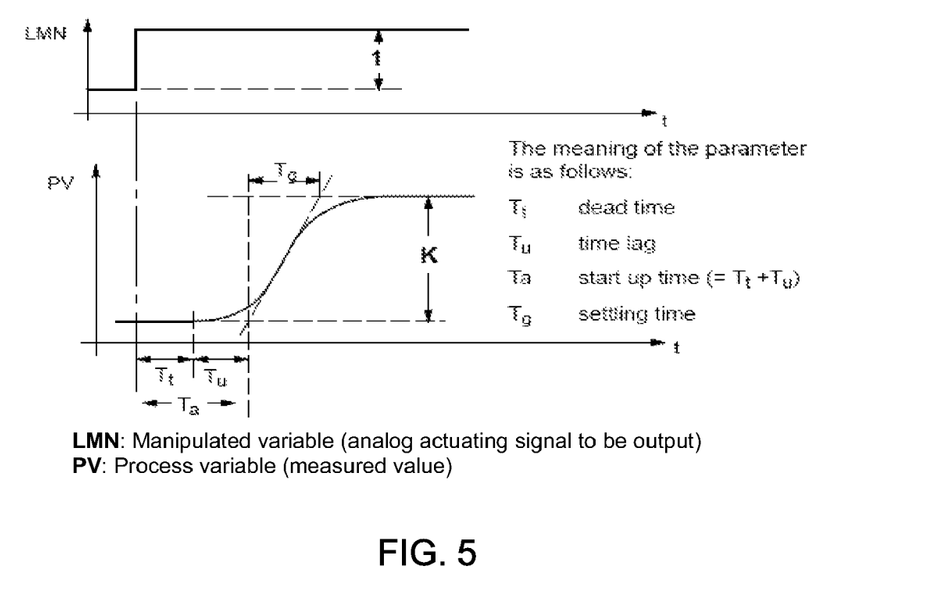
FIG. 5 illustrates a signal in response to a step function according to some embodiments.

FIG. 5 illustrates the sampling time T and the settling time $T_g$ of a signal's response to a step function. In some embodiments, FIG. 5 illustrates a process model. The second coefficient may comprise a value of a sum of the number 1 and the first coefficient. The third coefficient comprises a gain, as illustrated as variable K, multiplied by the second coefficient (e.g. $b=K(1-a)$). The value of d may be defined as a sampling delay time that represents an input time.

In some embodiments, a process model that is created through the use of ISDA engineering tools, such as those described below with respect to FIG. 6, may design the controller and the SPF. Furthermore, the SPF may be generated based on both the process model data and a sampling rate of the controller. In some embodiments, parameters for an alarm mechanism, such as those described with respect to FIG. 9, may be generated from the process model data.

Referring back to FIG. 4, at 407 the fourth data is transmitted to the controller system at a third time. The third time may be based on the same time interval upon which the first time and the second time (e.g. X milliseconds where X is an integer) are based. For example, at the third time the sensor gateway 302 may send a calculated or estimated water level to the controller system in lieu of an actual water level reading received from the sensor 301.

In some embodiments, the controller system may send first instruction data to the controlled device in response to the first data before receiving the second data. The first instruction data may comprise an instruction that the controlled device is to follow. For example, the instruction data may comprise an instruction for the controlled device to open a valve, an instruction for the controlled device to close a valve, or an instruction for the controlled device to do nothing. The first instruction data may be sent from the controller to the controlled device via the sensor gateway or, in some embodiments, the first instruction data may be sent directly to the controlled device via a wireless connection. The controller system may further send a second instruction data to the controlled device in response to the second data before receiving the third data, and the controller system may send a third instruction data to the controlled device in response to the fourth data.

Figure 6:
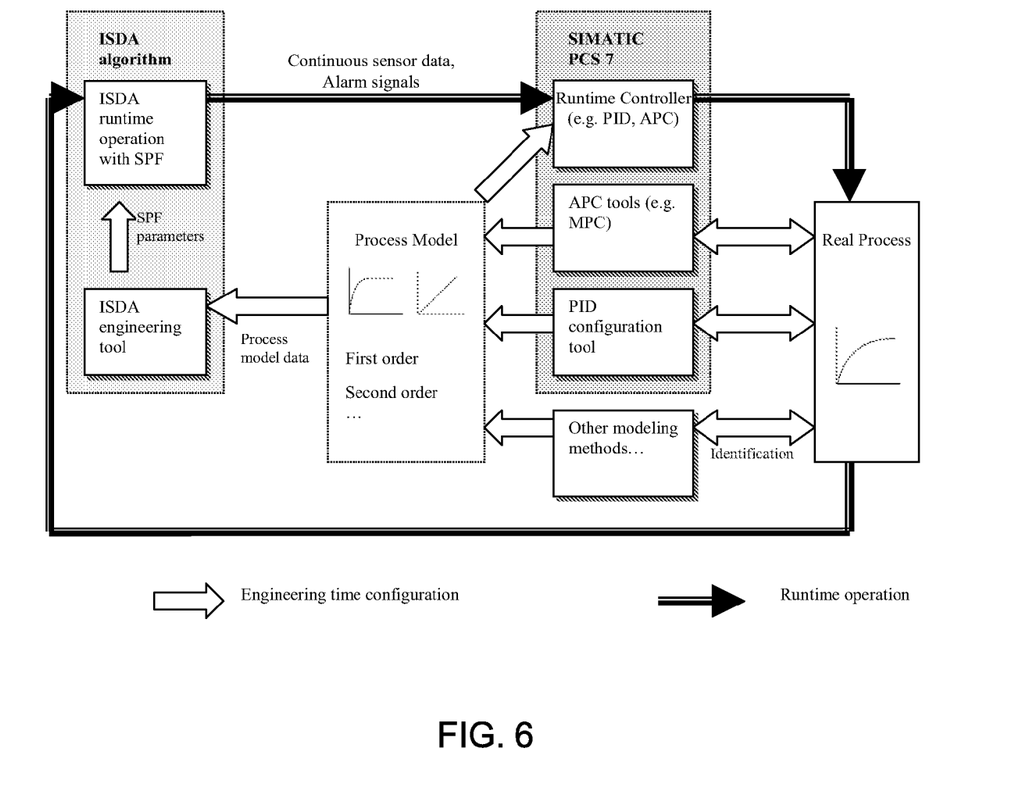
FIG. 6 illustrates a system according to some embodiments.

FIG. 6 illustrates an embodiment of a general architecture of the ISDA software module 304. The ISDA may comprise two phases, an engineering time (or configuration) phase and a runtime operation phase. In some embodiments, the ISDA may be applied to either a single-input single-output ("SISO") system or to a multi-input multi-output ("MIMO") system. In SISO systems with a PID controller, software may interact with a control function block to obtain parameters of a controller and to automatically generate SPF parameters. In MIMO systems, software may utilize an optimal state estimation technique such as, but not limited to, a Kalman filter, to generate SPF parameters based on a system state-space model.

Figure 8:
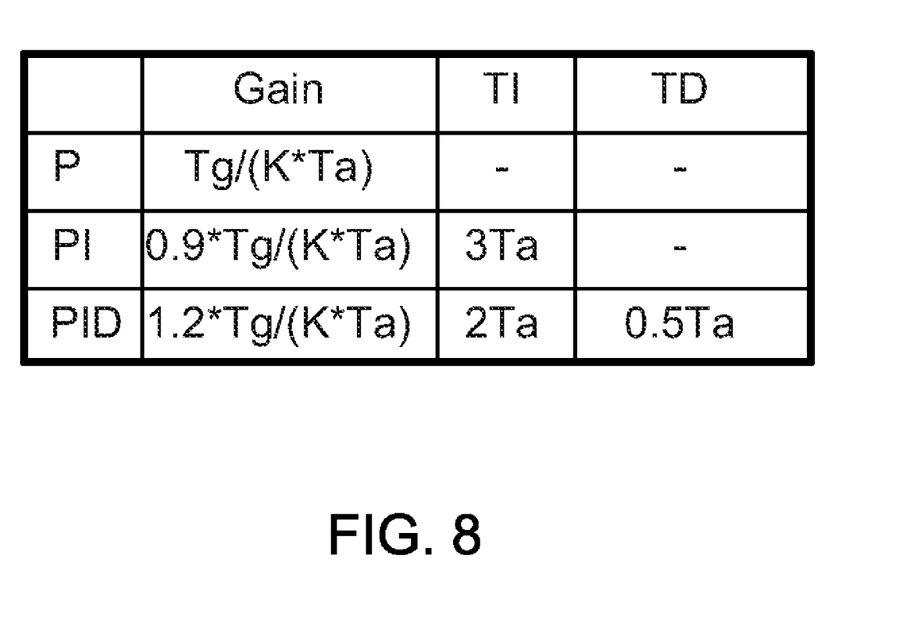
FIG. 8 is a table of process identification and controller design examples.

During engineering time, a proposed configuration tool (ISDA engineering tool) may automatically generate SPFs from a process model created by a process control system and a model identification tool such as, but not limited to, Siemens SIMATIC PCS 7® configuration tool. As illustrated, the SIMATIC PCS 7 tool comprises a plurality of modules such as, but not limited to, a runtime controller, an APC tool such as a multivariable process control ("MPC") tool, and a PID configuration tool. The aforementioned tools may create a process model based on a reaction curve, as illustrated in FIG. 5, in continuous time and discrete time. In some embodiments, the SIMATIC PCS 7 tool may comprise one or more PID controller configurations that are provided by the PID configuration tool. Examples of controller configurations are shown in FIG. 8. In some embodiments, the PID configuration tool may comprise an embedded curve recorder to record the reaction curve.

The configuration phase of the software may generate SPF parameters such as those described above. In particular, the software may interact with a control function block (e.g., with a PID Design Tool in the Siemens SIMATIC PCS 7 tool) to obtain parameters of the controller (e.g., PID controller) and to automatically generate the SPF parameters therefrom. In some embodiments, the obtained parameters may be sample outputs of the controller that are used in an SPF such as that described above with respect to FIG. 4. The SPFs may be created at a same time that a controller is designed. In some embodiments, each generated SPF may be executed in real time to provide predicted sensor data (e.g., $y_{2p}$ for the delayed $y_2$; $y_{3p}$ for the lost data $y_3$, or $y_{6p}$ for the bad/corrupted $y_6$, as in the example of FIG. 7).

During runtime operation, a time-out scheme, as discussed with respect to FIG. 4 and FIG. 5, is implemented to ensure synchronous delivery of sensor data based on a sampling rate of a control system. At each sampling instant, an ISD software module defines a time-out with a predefined threshold time. If a new data packet has arrived at the aggregator prior to the threshold time, then this new data packet is sent to the controller. If not, then a predicted sensor value is generated by SPFs and sent to the controller to provide continuous sensor data flow.

The runtime operation phase of the software provides ISDA functional blocks interconnecting with a control function block (e.g., within a SIMATIC PCS 7 tool). This may allow for real-time execution of SPFs to compensate for delayed or lost data packets, and a timing mechanism to implement timing synchronization.

The SPFs may be generated automatically by an ISDA engineering tool from process model data created by model identification tools. In some embodiments, the process models may be approximated by first order or second order transfer functions and these transfer functions may be identified during a stage of designing the controller and by using existing process model identification and controller design tools (e.g., Siemens SIMATIC PCS 7 tools).

The engineering tool steps according to some embodiments include: 1) a process model is created by a model identification tool, 2) a controller is designed based on the process model, and 3) a SPF is generated based on both the process model data identified in Step 1 and a controller sampling time determined in Step 2 by an ISDA engineering tool.

The process model, as illustrated in FIG. 6 and with respect to FIG. 5, is used to design the SPFs and the same model is also used to design the controller with the aforementioned tools. Thus, each time new sensor data arrives, an SPF gets updated and a prediction error is reset. The foregoing may allow a system's tolerance to data-packet loss and delay to be significantly increased.

As part of an industrial process control, a feedback controller, such as, but not limited to, a proportional-integral-derivative ("PID") controller or advanced process control ("APC") controller, may provide commands to a controlled device to improve stability of an industrial process. In some embodiments, the feedback controller may change the industrial process according to a selected time schedule or a selected time based on a sampling rate.

Figure 7:
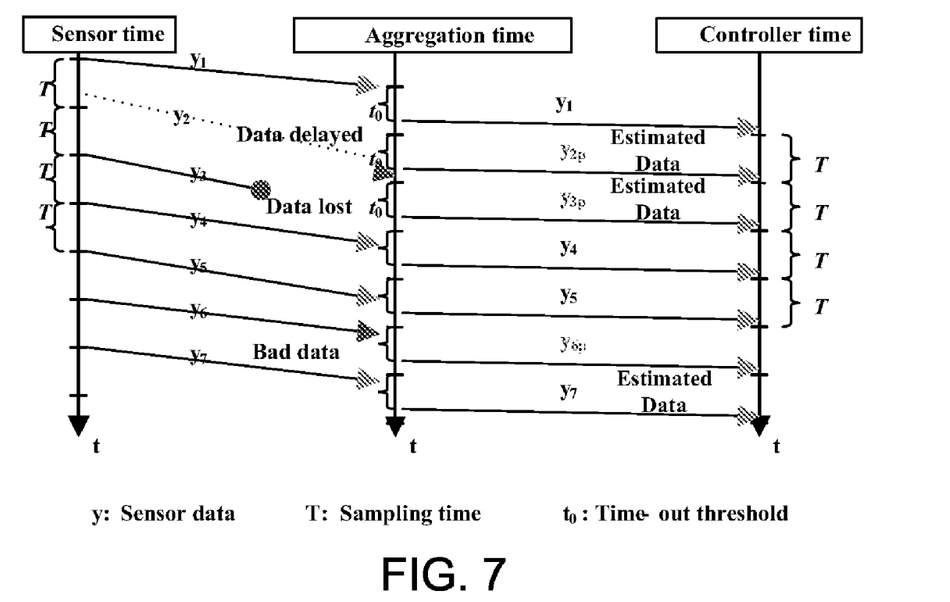
FIG. 7 illustrates transmission of data according to some embodiments.

FIG. 7 provides an example of the method described with respect to FIG. 4 according to some embodiments. For example, certain data arriving from wireless sensors might be delayed (e.g. $y_2$), or be lost (e.g. $y_3$), or be corrupted (e.g. $y_6$), due to wireless network interference. Since data $y_2$, $y_3$, and $y_6$ may either never arrive or may arrive after a predetermined time such as time out threshold to that occurs prior to the aggregation time t (e.g. a cut-off time), the intelligent sensor data aggregation according to some embodiments would estimate or predict such data ($y_{2p}$ for the delayed $y_2$; $y_{3p}$ for the lost data $y_3$, or $y_{6p}$ for the bad/corrupted $y_6$), and send the estimated or predicted data at the appropriate time $t_0$ the controller due to timing synchronization.

Figure 9:
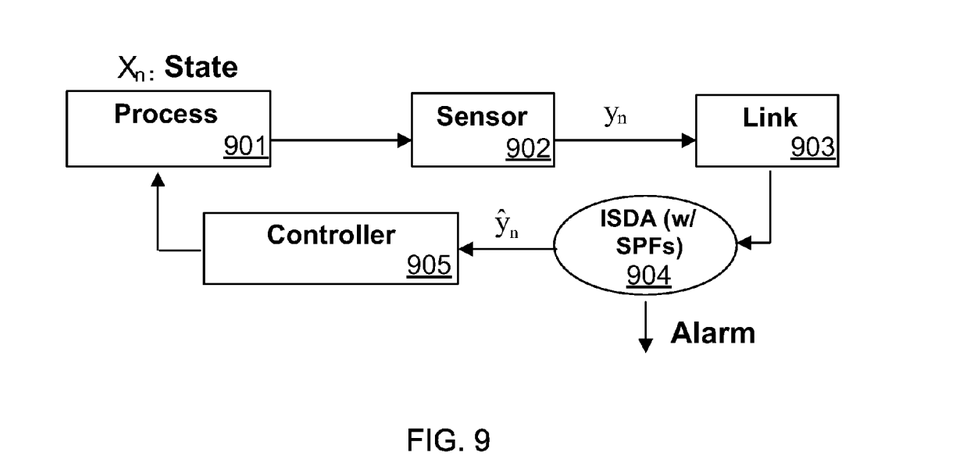
FIG. 9 illustrates an industrial process control according to some embodiments.

Now referring to FIG. 9, an industrial process control is illustrated according to some embodiments. A process controller 905 (e.g. a feedback controller such as a PID controller or APC controller) may keep a state ($x_n$) of an industrial process 901 stable (e.g. following state Set Point (SP)) or may change the industrial process state ($x_n$) according to a selected time schedule. The process controller 905 may facilitate a desired control performance and process behavior which may be based on a continuous data flow of reliable sensor feedback data ($y_n$) from a sensor 902.

In some embodiments, FIG. 9 illustrates the addition of intelligence in a data aggregation path between the controller 905 and a link 903 that receives data from the sensor 902. An ISDA 904, according to some embodiments, may use SPFs and a time-out scheme to compensate for lost, delayed or bad data, and to ensure synchronous delivery of sensor data based on a control system sampling rate. As further illustrated in FIG. 9, if sensor data ($y_n$) is transmitted to the link 903 through unreliable networks, the sensor data ($y_n$) may be delayed, lost, or bad due to network link failure or sensor failure, but the controller 905 may receive continuous sensor data flow ($\hat{y}_n$) from the ISDA 904.

In some embodiments, the ISDA may comprise an alarm mechanism, and if a confidence level of filtered sensor data provided by the ISDA 904 becomes lower than desired, the alarm mechanism may trigger an alarm. In some embodiments, the alarm mechanism may be provided to determine a confidence level of one or more SPFs. The confidence level may be monitored in real-time by the alarm mechanism and, in some embodiments, the confidence level may be based on an error level and a tolerance level.

The error level is a quality measure of the real-time control performance and may be defined as the ratio of the difference between the controlled state $x_n$ and the state Set Point (SP) over the state SP. In some embodiments, a user may define the error level. For example, a user may define an error level of 5 percent, which means the controlled process state $x_n$ may vary between 95 percent and 105 percent of the state SP.

The tolerance level may define a percentage of time during which the user may tolerate errors exceeding the error level. A tolerance level of 20 percent and error level of 5 percent indicate the acceptability of errors exceeding 5 percent 20 percent of the time. Therefore, the ISDA 904, and its associated alarm mechanism, may trigger an alarm when a desired confidence level is less than a calculated confidence level. For example, and continuing with the above example, if the ISDA 904 determines that error levels may rise above 5 percent 20 percent of the time, an alarm will be triggered and an operator will be alerted.

Figure 10:
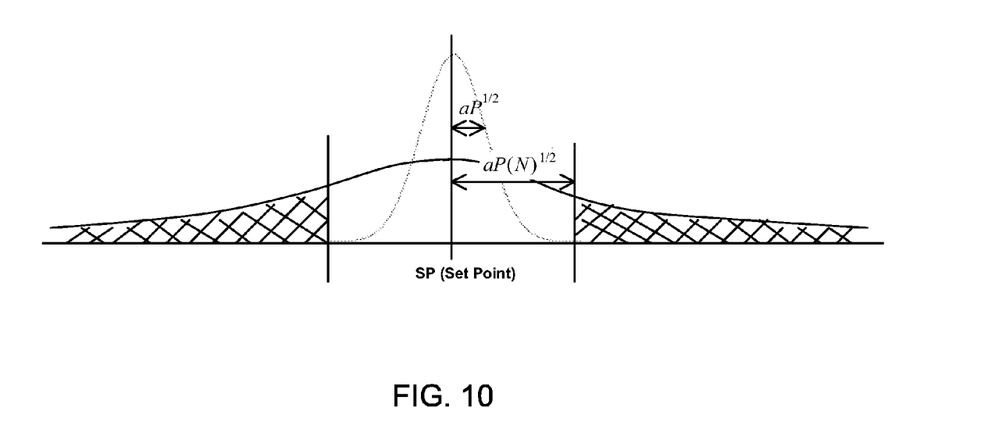
FIG. 10 illustrates an embodiment of a normal distribution of a process state prediction.

A determination of the tolerance level may be illustrated by FIG. 10. In some embodiments, FIG. 10 illustrates distributions of a state prediction error associated with an alarm mechanism. The state prediction error ($x_n - \hat{x}_n$) has a normal distribution. Thus, if no link failure or sensor failure exists, then a sensor value $y_n$ is normal, the state prediction error covariance $P_n$ may converge to P, and a predicted state $\hat{x}_n$ may converge to a state Set Point (SP). If network link failures or sensor failures exist, then a sensor value $y_n$ may be missing (or may not exist) for N steps, where N is an integer. Therefore, a state prediction error covariance grows from P to P(N) (i.e., possibility of the error exceeding the threshold becomes higher and the confidence in the filtered sensor data becomes lower as illustrated by the crosshatched areas of FIG. 10). Thus, in some embodiments, an alarm may be triggered when a confidence level becomes lower than desired.

Although particular embodiments have been described above, those in the art will note that various substitutions may be made to those embodiments described herein without departing from the spirit and scope of the appended claims.

What is claimed is:

1. A method comprising:

receiving a first data from a sensor of a controlled device via a wireless network at a first time;

transmitting the first data to a controller system;

receiving a second data from the sensor of the controlled device via the wireless network at a second time;

transmitting the second data to the controller system;

determining that a third data has not been received prior to a predetermined time period, or that the third data has been received prior to the predetermined time period and the third data is outside of a determined range of values;

calculating a fourth data based on the first data and the second data; and transmitting the fourth data to the controller system at a third time wherein the controller system sends a first instruction data to the controlled device in response to the first data before receiving the second data, sends a second instruction data to the controlled device in response to the second data before receiving the third data, and the controller system sends a third instruction data to the controlled device in response to the fourth data; and wherein the fourth data is based at least on a predicted sensor value comprising a sum of a first expression and a second expression, wherein the first expression comprises a product of the first data and a first coefficient subtracted from a product of the second data and a second coefficient, and wherein the second expression comprises a product of a first controlled device output and a third coefficient subtracted from a product of a second controlled device output and the third coefficient.

2. The method of claim 1, wherein the first coefficient comprises a value of a base of the natural logarithm raised to a power of a product of negative 1 and a sampling time divided by a settling time.

3. The method of claim 1 wherein the second coefficient comprises a value of a sum of the number 1 and the first coefficient and the third coefficient comprises a gain multiplied by the second coefficient.

4. The method of claim 1 further comprising:
triggering an alarm based on a calculated confidence level that is less than a desired confidence level.

5. The method of claim 1, wherein the difference between the first time and the second time is equal to the difference between the second time and the third time.

6. The method of claim 1, wherein the predetermined time period occurs prior to the third time.

7. An apparatus comprising:
a processor; and
a computer-readable medium comprising instructions that when executed by the processor perform a method, the method comprising:
receiving a first data from a sensor of a controlled device via a wireless network at a first time;
transmitting the first data to a controller system;
receiving a second data from the sensor of the controlled device via the wireless network at a second time;
transmitting the second data to the controller system;
determining that a third data has not been received prior to a predetermined time period, or that the third data has been received prior to the predetermined time period and the third data is outside of a determined range of values;
calculating a fourth data based on the first data and the second data; and
transmitting the fourth data to the controller system at a third time
wherein the controller system sends a first instruction data to the controlled device in response to the first data before receiving the second data, sends a second instruction data to the controlled device in response to the second data before receiving the third data, and the controller system sends a third instruction data to the controlled device in response to the fourth data; and
wherein the fourth data is based at least on a predicted sensor value comprising a sum of a first expression and a second expression, wherein the first expression comprises a product of the first data and a first coefficient subtracted from a product of the second data and a second coefficient, and wherein the second expression comprises a product of a first controller output and a third coefficient subtracted from a product of a second controller output and the third coefficient.

8. The apparatus of claim 7, wherein the first coefficient comprises a value of a base of the natural logarithm raised to a power of a product of negative 1 and a sampling time divided by a settling time.

9. The apparatus of claim 7, wherein the second coefficient comprises a value of a sum of the number 1 and the first coefficient and wherein the third coefficient comprises a gain multiplied by the second coefficient.

10. The apparatus of claim 7 further comprising instruction for:
triggering an alarm based on a calculated confidence level that is less than a desired confidence level.

11. The apparatus of claim 7, wherein the difference between the first time and the second time is equal to the difference between the second time and the third time.

12. The apparatus of claim 7, wherein the predetermined time period occurs prior to the third time.

13. A system comprising:
a controlled device;
a sensor to monitor the controlled device;
a controller system to provide commands to the controlled device: and
a sensor gateway to receive data from the sensor and comprising:
a processor; and
a computer-readable medium comprising instructions that when executed by the processor perform a method, the method comprising:
receiving a first data from a sensor of the controlled device via a wireless network at a first time;
transmitting the first data to the controller system;
receiving a second data from the sensor of the controlled device via the wireless network at a second time;
transmitting the second data to the controller system;
determining that a third data has not been received prior to a predetermined time period, or that the third data has been received prior to the predetermined time period and the third data is outside of a determined range of values;
calculating a fourth data based on the first data and the second data; and
transmitting the fourth data to the controller system at a third time
wherein the controller system sends a first instruction data to the controlled device in response to the first data before receiving the second data, sends a second instruction data to the controlled device in response to the second data before receiving the third data, and the controller system sends a third instruction data to the controlled device in response to the fourth data; and
wherein the fourth data is based at least on a predicted sensor value comprising a sum of a first expression and a second expression, wherein the first expression comprises a product of the first data and a first coefficient subtracted from a product of the second data and a second coefficient, and wherein the second expression comprises a product of a first controller output and a third coefficient subtracted from a product of a second controller output and the third coefficient.

14. The system of claim 13, wherein the first coefficient comprises a value of a base of the natural logarithm raised to a power of a product of negative 1 and a sampling time divided by a settling time, the second coefficient comprises a value of a sum of the number 1 and the first coefficient, and the third coefficient comprises a gain multiplied by the second coefficient.

* * * * *